Aug. 18, 1925.

J. A. CHARTER 1,550,651

METAL WHEEL WELDING MACHINE

Filed June 25, 1921     2 Sheets-Sheet 2

Inventor:
James A. Charter,
By Cheever & Cox
attys.

Patented Aug. 18, 1925.

1,550,651

UNITED STATES PATENT OFFICE.

JAMES A. CHARTER, OF CHICAGO, ILLINOIS.

METAL-WHEEL-WELDING MACHINE.

Application filed June 25, 1921. Serial No. 480,280.

*To all whom it may concern:*

Be it known that I, JAMES A. CHARTER, a citizen of the United States, residing at Chicago, in the county of Cook and State of Illinois, have invented a certain new and useful Improvement in Metal-Wheel-Welding Machines, of which the following is a specification.

As is well understood in the art, it is now common automobile practice to use metal wheels made up of a hub, a rim, and one or more discs welded to the rim and the hub. In making such wheels wherever and however used there is serious difficulty in positioning the metallic disc or discs with reference to the rim so that when welded a true wheel is produced.

The object of this invention is to provide a more or less automatic machine in which the rim is accurately centered with reference to and held at right angles to the axis of the wheel to be produced in which the disc or discs to be welded thereto is accurately positioned in the rim and with reference to said wheel's center and in which each disc can be by continuous operation welded to the rim, or hub, or both, to thereby form in one single machine, in one single welding operation an accurately constructed wheel of the type described.

The invention consists in a machine capable of carrying out the foregoing objects, which can be easily and economically made, which is adjustable in all necessary directions to accommodate wheels and parts thereof of different sizes and in which the welding agent or material is fed continuously along the lines to be welded, without the assistance of expensive manual labor, heretofore required in performing the welding operation. The invention further consists in many features and details of construction, more fully set forth in the specification and claims.

Figure 1:
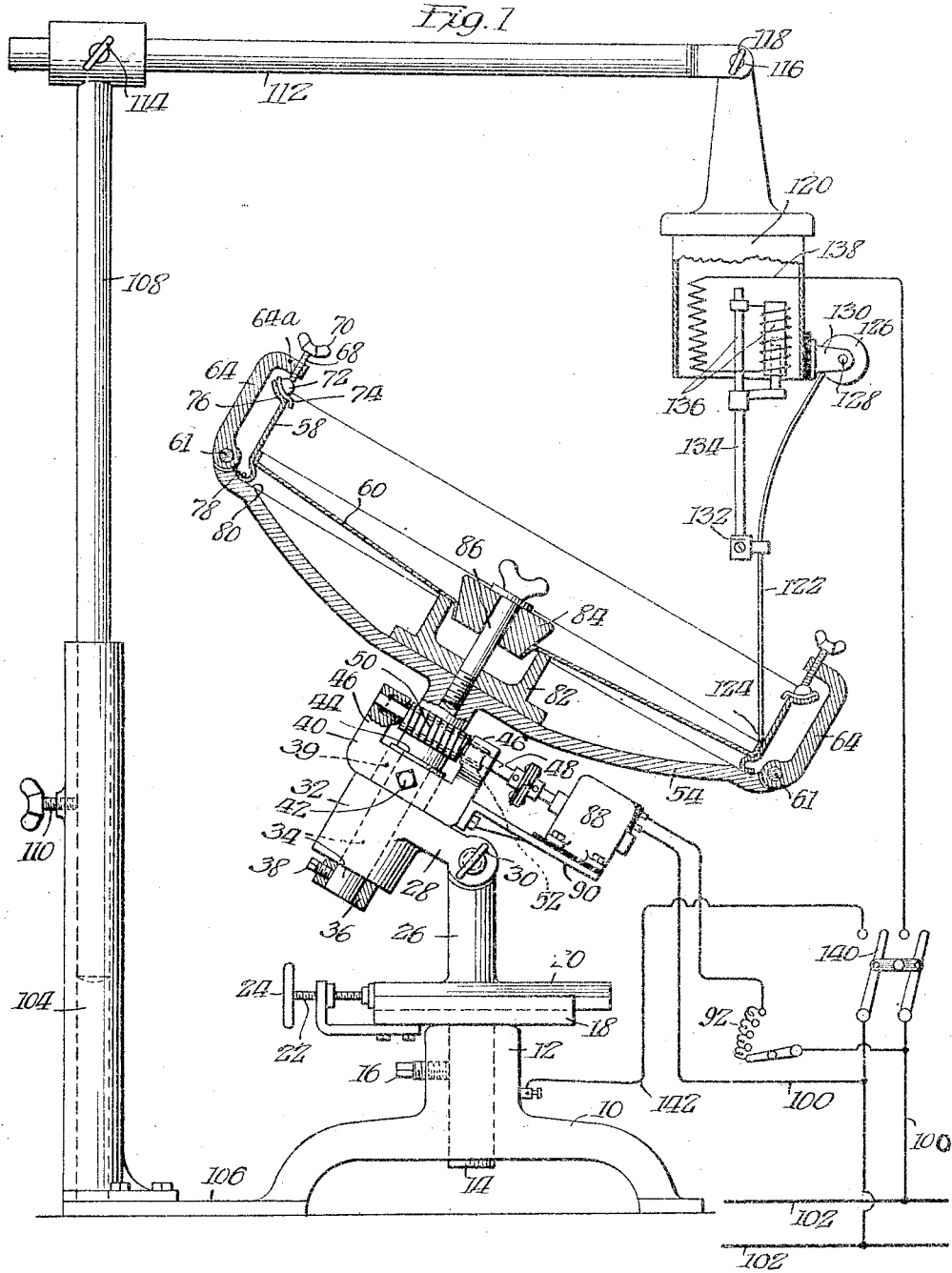

Referring to the drawings in which like numerals designate the same parts thruout the several views, Figure 1 is a side elevation, partially in section, of mechanism illustrating this invention in its preferred form when applied to the operation of welding one of the discs to the rim.

Figure 2:
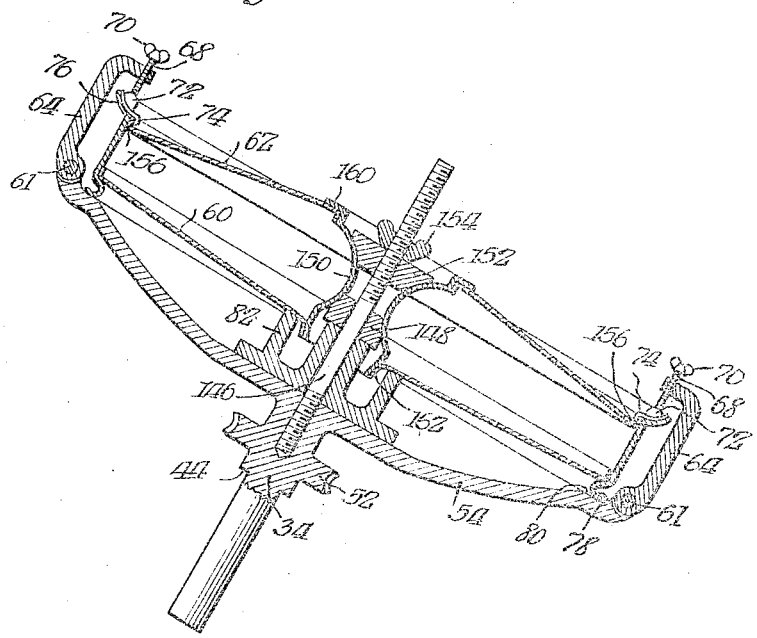

Figure 2 is a sectional view of the wheel retaining mechanism of Figure 1, showing the addition of necessary parts applied to Figure 1 to hold the hub and second disc in place preparatory to welding these parts in place.

The machine is conventionally mounted on a floor stand 10, having extending upward from its center a hub 12 in which is rotatably mounted a shaft 14, detachably securable in non-rotative position by set screw 16. The upper end of shaft 14 carries a table 18 across which is slidable transversely a second table 20 adapted to be controlled by a conventional slow motion screw 22 and hand wheel 24. Rising from this second table 20 is a standard 26 to whose upper end is pivotally mounted an arm 28 held in place by a conventional form of lock screw and handle mechanism 30 by means of which the angular position of the arm 28, with reference to the standard 26 may be adjusted.

The arm 28 carries on its end a bearing hub 32 and an extension 39 thereof, in which is journaled a shaft 34 carrying at its lower end collar 36 held in place by a lock nut 38. Extension 39 carries a cross head 40 held in place by a set screw 42. The upper portion of shaft 34 carries a thrust collar 44, bearing on the end of cross head 40, between U-shaped arms 46 extending from the cross head. Journaled in the arms 46 is a laterally extending shaft 48 carrying a worm 50 meshing with the worm wheel 52 mounted as shown in Figure 2 on shaft 34. Also carried on shaft 34 in the particular case illustrated, Figure 2, integral therewith is a saucer shaped disc 54 of suitable size for the reception of the wheel rim 58 and wheel discs 60 and 62.

Pivoted to the circumference of saucer shaped disc 54 on suitable pivotal bearings 61, are a plurality of separated swinging clamp arms 64 adapted to, as shown in the figures, embrace the wheel rim 58. A sufficient number of these clamp arms are located at separated points around the circumference of the disc 54 so that the wheel rim may be supported at sufficient points to hold it rigidly concentric with the axis of shaft 34. Each of these clamp arms is provided at its outer or free swinging end with a right angularly turned end 64ª, thru which is passed a threaded screw 68 manipulatable by thumb nut 70 to cause a bearing block 72 conventionally journaled on the end of the screw 68 to be reciprocated backward and forward as the case may be to cause the rim engaging angular plate 74 carried by the block 72 to press into engagement with or to be withdrawn from the edge of the flange 76 of the wheel rim 58. The saucer shaped disc 54 is preferably made of such a diameter that when a wheel rim 58 is put in place as shown in the figures, with its rim flange 78 bearing in a suitably formed surface 80 on the disc, provided for it, the rim will be accurately centered and positioned at right angles to the axis of the shaft 34 and the operator can then by simply swinging the arms 64 to the positions shown in the drawings, and manipulating the screws 70 clamp it in place, in which position it is held by the devices described during the welding operation of applying the inner discs 60 and except as hereafter noted during the welding operation of applying the outer disc 62.

Having positioned the wheel rim 58 in the manner described the operator then applies inside the rim a positioning die 82, the wheel disc 60, a positioning central cone 84 and a screw 86 entering the end of shaft 34. This positioning die 82 and the conical member 84 are so constructed that when assembled as shown they accurately hold and position the wheel disc 60 in its exact proper position with reference to the rim 58 to which it is to be welded. The shaft 48, heretofore described has coupled to it by any suitable means a motor mechanism of any conventional form, in the particular case here illustrated an electric motor mounted on a bracket 90 suspended from the cross head 40. In the particular case here illustrated the motor 88 is of the variable speed type, conventionally shown as controlled by the resistance mechanism 92 inserted in circuit wires 100, to which current is supplied from any suitable external source by conventional line wires 102. The object of using the variable speed motor is so that the operator can accurately control the speed rotation of the disc 44, and consequently the wheel being formed as may be required by the operator to insure proper continuous welding at the line of juncture between the rim and adjacent disc 60 or 62, it being well understood in the welding art that in welding along a line welding does not take place at uniform speed at all points.

Suitably mounted on a stationary standard 104 which in the particular case here illustrated happens to be an extension 106 of the base 10, is a vertically adjustable rod 108, detachably securable in place by a set screw 110. Transversely slidable across the rod 108 is a horizontal rod 112 detachably securable in position by such a screw 114. Suitably suspended from the end of rod 112 on a pivotal connection 116 controlled by set screw 118 is a head mechanism 120 carrying a wire feeding mechanism. The wire referred to, indicated in Figure 1 as 122, may be of pure solder or alloy adapted when electrically fused at the point 124 to effect electric welding between the wheel parts adjacent thereto. This wire 122 may be provided in short pieces or from a continuous roll carried by reel 126 pivotally mounted at 128 in the suitable frame 130 secured to the head 120.

The lower or working portion of the wire 122 is temporarily rigidly held by a clamping mechanism 132 of conventional form on a vertically reciprocatable rod 134 controlled by feed mechanism 136 carried within the head 120 supplied by electric current by wire 138 controlled by electric switch 140.

This feeding device 136 may be of any conventional form of mechanism, such for instance as that common in the electric light art for progressively feeding the upper carbon of a lamp, as it burns away. The mechanism is used in this instance, without claim as to detail for feeding and holding the wire 122 in proper fusing position while welding the wheel parts together.

The welding circuit thru the wire 122 and the work is completed by allowing the current after passing the arc at 124 to pass thru the machine and thence return via wire 142 back to switch 140 and thence to the feed line 102.

In the operation of the parts thus far described the operator assembles everything as shown in Figure 1 and then manipulates switch 140 to cause the current to flow thru the wire 122 into the work. On completing this circuit, the operator starts the motor 88 to rotate the disc 54 and adjusts the speed of the motor as is required so that when the machine has made one complete revolution about the axis of the shaft 34, the disc 60 will be completely welded at all points around the circumference of rim 58 where there is contact. Having completed this rotation of the wheel parts, the operator opens switch 140 and stops motor 88.

The operator now removes screw 86 and block 84, substitutes in place thereof another screw 146, another block 148, the wheel disc 62, wheel hub 150, another block 152, and a thumb nut 154. On turning up this latter thumb nut the outer disc is assembled in proper position and all the operator has to do is to apply the wire 122 at the line of contact 156 to make a weld between this disc and the rim, while the wheel 54 is properly rotated as before. In case, in so rotating the disc 54 for this latter welding operation, a given clamping device 68—74 is in the way of the wire 122 the operator can in the obvious manner temporarily release the particular clamping device while the wire 120 is being passed by the part of the wheel which is clamped by that particular clamping device. The operator can then after the wire is passed, restore that particular clamping device to normal position shown and open the next clamping device when it reaches the wire.

The blocks 148 and 152, referred to, are oppositely positioned cones fitting into the hub 150 and should be so accurately made that when the thumb nut 154 is rotated into place, thus moving the block 152 toward the block 148 the wheel will be accurately forced to centered position on the central axis of shaft 34 and held in accurate position at right angles thereto so that the finished wheel will be accurately made with its rim concentric with the proper axis without the necessity of machining the rim or resoldering, as has been frequently required in the prior art where this machine is not used.

By adjusting the rod 112, with reference to the rod 108 and if necessary adjusting the latter rod vertically, the head 120 may be moved as desired so that the wire 122 may be used to solder or weld the seam 160 between the hub 150 and the flange 62 and to, when the wheel is reversed in position with reference to the disc 54, weld the seam 162 between the hub 150 and the disc 60.

Obviously, by proper use of pivotal adjustment at 30, the adjusting screw 22 and the vertically adjustable shaft 14, the parts described may be used within reasonable limits to work in any required position dictated by the size or particular configuration of the wheel to be made.

Having thus described my invention, what I claim as new and desire to secure by Letters Patent, is:

1. In mechanism of the class described, a rotatable member, means for mounting thereon a disc and a separate concentric ring ready to be welded together in a circular line of contact between the disc and ring about the axis of said rotatable member, means for supporting a wire of solder material or the like with its end at a point on said circular line where the weld is to be made, means for supplying electric current thru said wire to the parts to be welded, means for rotating the rotatable member and means for progressively feeding the wire, as weld takes place, to keep it in proper proximity to the line on which the weld is to be made.

2. In mechanism of the class described, a rotatable member, means for mounting thereon a disc and a separate concentric ring ready to be welded together in a circular line of contact between the disc and ring about the axis of said rotatable member, means for supporting a wire of solder material or the like with its end at a point on said circular line where the weld is to be made, means for supplying electric current thru said wire to the parts to be welded, means for rotating the rotatable member, means for progressively feeding the wire, as weld takes place, to keep it in proper proximity to the line on which the weld is to be made, and means for varying the speed of rotation of the rotatable member.

3. In mechanism of the class described, a rotatable member, means for mounting thereon a disc and a separate concentric ring ready to be welded together in a circular line of contact between the disc and ring about the axis of said rotatable member, means for supporting a wire of solder material or the like with its end at a point on said circular line where the weld is to be made, means for supplying electric current thru said wire to the parts to be welded, means for rotating the rotatable member, means for progressively feeding the wire, as weld takes place, to keep it in proper proximity to the line on which the weld is to be made, and means for adjusting in substantially all directions the position of the rotatable member with reference to the wire.

4. In mechanism of the class described, a rotatable member, means for mounting thereon a disc and a separate concentric ring ready to be welded together in a circular line of contact between the disc and ring about the axis of said rotatable member, means for supporting a wire of solder material or the like with its end at a point on said circular line where the weld is to be made, means for supplying electric current thru said wire to the parts to be welded, means for rotating the rotatable member, means for progressively feeding the wire, as weld takes place, to keep it in proper proximity to the line on which the weld is to be made, means for varying the speed of rotation of the rotatable member, and means for adjusting in substantially all directions the position of the rotatable member with reference to the wire.

5. In mechanism of the class described, a rotatable member, means for mounting thereon a disc and a separate concentric ring ready to be welded together in a circular line of contact between the disc and ring about the axis of said rotatable member, means for supporting a wire of solder material or the like with its end at a point on said circular line where the weld is to be made, means for supplying electric current thru said wire to the parts to be welded, means for rotating the rotatable member, means for progressively feeding the wire, as weld takes place, to keep it in proper proximity to the line on which the weld is to be made, and means for vertically and laterally adjusting the position of the wire supporting apparatus with reference to the rotatable member.

6. In mechanism of the class described, a rotatable member, means for mounting thereon a disc and a separate concentric ring ready to be welded together in a circular line of contact between the disc and ring about the axis of said rotatable member, means for supporting a wire of solder material or the like with its end at a point on said circular line where the weld is to be made, means for supplying electric current thru said wire to the parts to be welded, means for rotating the rotatable member, means for progressively feeding the wire, as weld takes place, to keep it in proper proximity to the line on which the weld is to be made, means for varying the speed of rotation of the rotatable member, and means for vertically and laterally adjusting the position of the wire supporting apparatus with reference to the rotatable member.

7. In mechanism of the class described, a rotatable member, means for mounting thereon a disc and a separate concentric ring ready to be welded together in a circular line of contact between the disc and ring about the axis of said rotatable member, means for supporting a wire of solder material or the like with its end at a point on said circular line where the weld is to be made, means for supplying electric current thru said wire to the parts to be welded, means for rotating the rotatable member, means for progressively feeding the wire, as weld takes place, to keep it in proper proximity to the line on which the weld is to be made, means for adjusting in substantially all directions the position of the rotatable member with reference to the wire, and means for vertically and laterally adjusting the position of the wire supporting apparatus with reference to the rotatable member.

8. In mechanism of the class described, a rotatable member, means for mounting thereon a disc and a separate concentric ring ready to be welded together in a circular line of contact between the disc and ring about the axis of said rotatable member, means for supporting a wire of solder material or the like with its end at a point on said circular line where the weld is to be made, means for supplying electric current thru said wire to the parts to be welded, means for rotating the rotatable member, means for progressively feeding the wire, as weld takes place, to keep it in proper proximity to the line on which the weld is to be made, means for varying the speed of rotation of the rotatable member, means for adjusting in substantially all directions the position of the rotatable member with reference to the wire, and means for vertically and laterally adjusting the position of the wire supporting apparatus with reference to the rotatable member.

9. In mechanism of the class described, a rotatable member, means for rotating it, a support on the rotatable member, concentric with its axis adapted to receive a wheel rim and a plurality of detachable devices rigidly clamping the wheel rim to said support in such position that the rim is concentric with the axis of rotation of the rotatable member.

10. In mechanism of the class described, a rotatable member, means for securing a wheel rim thereto with the axis of the rim coincident with the axis of the rotatable member, means for supporting a wheel disc in such a position with reference to the wheel rim that when welded thereto the resulting wheel part will be at right angles to the axis of the rotatable member, and means for electrically welding the disc to the rim while held in that position.

11. In mechanism of the class described, a rotatable member, means for securing a wheel rim thereto with the axis of the rim coincident with the axis of the rotatable member, means for supporting a wheel disc in such a position with reference to the wheel rim that when welded thereto the resulting wheel part will be at right angles to the axis of the rotatable member, means for electrically welding the disc to the rim while held in that position, means for applying a second disc to the rim and first disc; similarly accurately positioning and finally welding it in place.

12. In mechanism of the class described, a rotatable member, means for securing a wheel rim thereto with the axis of the rim coincident with the axis of the rotatable member, means for supporting a wheel disc in such a position with reference to the wheel rim that when welded thereto the resulting wheel part will be at right angles to the axis of the rotatable member, means for electrically welding the disc to the rim while held in that position, means for applying a wheel hub and a second disc to the rim and first disc, similarly accurately positioning the second disc and finally welding it in place.

13. In mechanism of the class described, a wheel carrying rotatable member, means for mounting wheel parts in the position in which they are to be welded together thereon in such a position that the wheel when formed will be substantially true with reference to the axis of the rotatable member, means for rotating the wheel carrier member, means for continuously supplying welding material at a point of juncture of two parts of the wheel to be welded together, means for supplying electric current thru said welding material and the wheel parts, and means for rotating the wheel carrier member while current is being so supplied to effect a continuous circular weld between the wheel parts worked on, for the purposes set forth.

14. In mechanism of the class described, a saucer shaped disc 54, means for rotating it, swinging clamping devices on the edge of said disc adapted to engage and hold a wheel rim on said saucer shaped disc with the body of said rim at right angles to the axis of said disc.

15. In mechanism of the class described, a saucer shaped disc 54, means for rotating it, swinging clamping devices on the edge of said disc adapted to engage and hold a wheel rim on said saucer shaped disc with the body of said rim at right angles to the axis of said disc, means at the center of said saucer shaped disc comprising a die 82 and a wedge block 84, and means for forcing them together adapted to position a wheel disc in the wheel rim to such an accurate position that when the wheel disc is welded to the wheel rim an accurately formed wheel is produced without subsequent mechanical treatment.

16. In mechanism of the class described, a rotatable member, means for securing a wheel rim thereto with the axis of the rim coincident with the axis of the rotatable member, means for supporting a wheel disc in such a position with reference to the wheel rim that when welded thereto the resulting wheel part will be at right angles to the axis of the rotatable member, means for electrically welding the disc to the rim while held in that position, means for applying a wheel hub and a second disc to the rim and first disc, means positioning the hub and second disc axially of the first disc and rim, and means finally applying said welding mechanism to weld the second disc to the rim.

In witness whereof, I have hereunto subscribed my name.

JAMES A. CHARTER.